United States Patent
Ferraro et al.

(10) Patent No.: US 11,834,534 B2
(45) Date of Patent: Dec. 5, 2023

(54) RANDOM PROPYLENE-ETHYLENE COPOLYMERS

(71) Applicant: BASELL POLIOLEFINE ITALIA S.R.L., Milan (IT)

(72) Inventors: Gianpiero Ferraro, Ferrara (IT); Gianni Vitale, Ferrara (IT); Fabrizio Piemontesi, Ferrara (IT); Benedetta Gaddi, Ferrara (IT); Gianni Collina, Ferrara (IT); Giampiero Morini, Ferrara (IT); Caroline Cathelin, Ferrara (IT); Marco Ciarafoni, Ferrara (IT); Claudio Cavalieri, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 367 days.

(21) Appl. No.: 17/268,653

(22) PCT Filed: Aug. 12, 2019

(86) PCT No.: PCT/EP2019/071524
§ 371 (c)(1),
(2) Date: Feb. 16, 2021

(87) PCT Pub. No.: WO2020/038746
PCT Pub. Date: Feb. 27, 2020

(65) Prior Publication Data
US 2021/0179751 A1    Jun. 17, 2021

(30) Foreign Application Priority Data

Aug. 22, 2018 (EP) ..................... 18190227

(51) Int. Cl.
*C08F 210/16* (2006.01)
*C08F 210/06* (2006.01)

(52) U.S. Cl.
CPC .......... *C08F 210/06* (2013.01); *C08F 210/16* (2013.01)

(58) Field of Classification Search
CPC ............................. C08F 210/16; C08F 210/06
See application file for complete search history.

(56) References Cited

U.S. PATENT DOCUMENTS

| | | | | |
|---|---|---|---|---|
| 6,441,094 B1 * | 8/2002 | Cecchin | .................. | C08L 53/00 525/240 |
| 6,599,986 B2 * | 7/2003 | Pelliconi | .................. | C08L 23/10 525/240 |
| 7,649,052 B2 * | 1/2010 | Massari | .................. | C08L 23/16 525/240 |
| 8,017,206 B2 * | 9/2011 | De Palo | .................. | B32B 27/32 525/240 |
| 8,993,678 B2 * | 3/2015 | Galvan | .................. | C08L 23/14 525/240 |
| 9,120,922 B2 * | 9/2015 | Eckmayr | .................. | C08L 23/12 |
| 9,676,883 B2 * | 6/2017 | Piemontesi | .......... | C08F 210/06 |
| 10,155,827 B2 * | 12/2018 | Massari | ..................... | C08J 5/18 |
| 10,266,671 B2 * | 4/2019 | Watson | .................. | C08K 5/105 |
| 10,519,306 B2 * | 12/2019 | Wang | ......................... | C08J 5/18 |
| 2017/0066856 A1 * | 3/2017 | Massari | ................ | C08L 23/142 |
| 2017/0198125 A1 * | 7/2017 | Tsukahara | .............. | C08K 5/053 |
| 2021/0253755 A1 * | 8/2021 | Fedec | .................. | C08F 210/06 |

FOREIGN PATENT DOCUMENTS

| | | |
|---|---|---|
| CN | 102639309 A | 8/2012 |
| CN | 103154124 A | 6/2013 |
| CN | 103842427 A | 6/2014 |
| CN | 106232642 A | 12/2016 |
| CN | 106232643 A | 12/2016 |
| CN | 108137888 A | 6/2018 |
| EP | 2338656 A1 | 6/2011 |
| WO | 2015169653 A1 | 11/2015 |
| WO | 2015169831 A1 | 11/2015 |

OTHER PUBLICATIONS

International Search and Written Opinion dated Nov. 27, 2019 (Nov. 27, 2019) for Corresponding PCT/EP2019/071524.

* cited by examiner

*Primary Examiner* — Rip A Lee

(57) ABSTRACT

A propylene ethylene copolymer having the following features:
an ethylene content of between 1.0 and 4.0% by weight;
a molecular weight distribution (MWD), expressed in terms of Mw/Mn, of greater than 4.0;
a content of xylene soluble fraction (XS) and ethylene content (C2) that fulfills the following relationship:

$$(C2 \times 1.1) + 1.25 < XS < (C2 \times 1.1) + 2.50$$

where:
XS=% by weight of the fraction soluble in xylene at 25° C.;
C2=% by weight of ethylene units in the copolymer determined via NMR;
a melt flow rate (MFR; 230° C., 2.16 kg) of between 30 to 75 g/10 min;
an intrinsic viscosity of the copolymer of lower than 1.5 dl/g; and
an intrinsic viscosity of the fraction soluble in xylene at 25° C. of higher than 0.32 dl/g.

10 Claims, No Drawings

RANDOM PROPYLENE-ETHYLENE COPOLYMERS

This application is the U.S. National Phase of PCT International Application PCT/EP2019/071524, filed Aug. 12, 2019, claiming benefit of priority to European Patent Application No. 18190227.1, filed Aug. 22, 2018, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to random propylene/ethylene copolymers.

BACKGROUND OF THE INVENTION

Propylene ethylene copolymers wherein the comonomer is randomly distributed in the polypropylene chain are random propylene copolymers. Compared with propylene homopolymers, the copolymers have a molecular structure which is modified by the presence of the comonomer, leading to a lower degree of crystallinity therein. It is believed that the molecular structure of random copolymers results in lower melting temperatures, lower sealing temperatures and lower moduli of elasticity with respect to propylene homopolymers.

As a downside, the introduction of the comonomer into the polypropylene chain leads to an increase in the fraction of polymer which is soluble in xylene at 25° C., the soluble polymer made from or containing low molecular weight chains and percentages of comonomer which are higher than the average content of comonomer calculated on the basis of the whole polymer. In some instances, the amount of soluble fraction increases as the content of comonomer in the copolymer increases. In some instances, the amount of soluble fraction precludes the use of the copolymers in certain sectors, including films for wrapping food, unless the soluble fraction is eliminated. In some instances, the amount of the fractions decreases the flowability of the polymer granules, thereby making operations such as discharging and transferring the polymer difficult, and giving rise to operation problems in the polymerization plant. In some instances, the amount of the soluble fractions leads to deterioration of the optical properties and the organoleptic properties, which is believed to result from migration of these fractions to the surface (blooming).

SUMMARY OF THE INVENTION

In a general embodiment, the present disclosure provides a propylene ethylene copolymers having the following features:
an ethylene content of between 1.0 and 4.0% by weight;
a molecular weight distribution (MWD), expressed in terms of Mw/Mn, greater than 4.0;
a content of xylene soluble fraction (XS) and ethylene content (C2) that fulfills the following relationship:

$$(C2 \times 1.1)+1.25 < XS < (C2 \times 1.1)+2.50$$

where:
XS=% by weight of the fraction soluble in xylene at 25° C.;
C2=% by weight of ethylene units in the copolymer determined via NMR;
a melt flow rate (MFR; 230° C., 2.16 kg) of between 30 to 75 g/10 min;
an intrinsic viscosity of the copolymer of lower than 1.5 dl/g; and
an intrinsic viscosity of the fraction soluble in xylene at 25° C. of higher than 0.32 dl/g.

DETAILED DESCRIPTION OF THE INVENTION

In some embodiments, the present disclosure provides a propylene ethylene copolymers having the following features:
an ethylene content of between 1.0 and 4.0% by weight; alternatively between 1.5 and 3.8 wt %; alternatively between 1.5 wt % and 2.5 wt %;
a molecular weight distribution (MWD), expressed in terms of Mw/Mn, of greater than 4.0; alternatively greater than 5.0; alternatively greater than 5.5; alternatively the molecular weight distribution is lower than 10; alternatively lower than 8; alternatively lower than 7.0;
a content of xylene soluble fraction (XS) and ethylene content (C2) that fulfills the following relationship:

$$(C2 \times 1.1)+1.25 < XS < (C2 \times 1.1)+2.5$$

where:
XS=% by weight of the fraction soluble in xylene at 25° C.; and
C2=% by weight of ethylene units in the copolymer as determined via NMR;
In some embodiments, the relationship is:

$$(C2 \times 1.1)+1.3 < XS < (C2 \times 1.1)+2.4$$

alternatively, the relation is:

$$(C2 \times 1.1)+1.35 < XS < (C2 \times 1.1)+2.3$$

a melt flow rate (MFR; 230° C., 2.16 kg) of between 30 to 75 g/10 min; alternatively between 30 and 70 g/10 min; alternatively between 30 and 60 g/10 min;
an intrinsic viscosity of the copolymer of lower than 1.5 dl/g; alternatively lower than 1.3 dl/g; alternatively lower than 1.1 dl/g; and
an intrinsic viscosity of the fraction soluble in xylene at 25° C. of higher than 0.32 dl/g; alternatively higher than 0.33 dl/g; alternatively higher than 0.36 dl/g.

In some embodiments, the propylene ethylene copolymer is made from or containing propylene and ethylene comonomers.

In some embodiments and in the propylene/ethylene copolymer, the 2,1 propylene insertions are undetectable via $C^{13}$ NMR.

In some embodiments, the propylene ethylene copolymer is used in a process for making articles of manufacture. In some embodiments, the process is injection molding. In some embodiments, the propylene ethylene polymer have an oligomer content measured in the ex reactor polymer lower than 1000 ppm; alternatively lower than 930 ppm. It is believed that the oligomer content affects organoleptic properties of articles of manufacture. In some embodiments, the present disclosure provides an article of manufacture. In some embodiments, the article of manufacture is an injection-molded article.

As used herein, the term "ex reactor polymer" refers to a polymer absent additives and without being subjected to chemical or physical degradation such as visbreaking by using peroxides.

In some embodiments, the propylene ethylene copolymer is prepared by a process including the step of polymerizing propylene with ethylene, in the presence of a catalyst made from or containing the product of the reaction between:
(i) a solid catalyst component made from or containing Ti, Mg, Cl, and at least one electron donor compound made from or containing from 0.1 to 50% wt of Bi with respect to the total weight of the solid catalyst component;
(ii) an alkylaluminum compound; and
(iii) an external electron-donor compound having the formula:

$(R^1)_a Si(OR^2)_b$ wherein $R^1$ and $R^2$ are independently selected among alkyl radicals with 1-8 carbon atoms, optionally containing heteroatoms, a is 0 or 1, and a+b=4.

In some embodiments and in the catalyst component, the content of Bi ranges from 0.5 to 40% wt, alternatively from 1 to 35% wt, alternatively from 2 to 25% wt, alternatively from 2 to 20% wt, based upon the total weight of the catalyst component.

In some embodiments, the particles of the solid component have substantially spherical morphology and an average diameter ranging between 5 and 150 μm, alternatively from 20 to 100 μm, alternatively from 30 to 90 μm. As used herein, the term "substantially spherical morphology" refers to particles having the ratio between the greater axis and the smaller axis equal to or lower than 1.5, alternatively lower than 1.3.

In some embodiments, the amount of Mg ranges from 8 to 30% wt, alternatively from 10 to 25% wt, based upon the total weight of the solid catalyst component.

In some embodiments, the amount of Ti ranges from 0.5 to 5% wt, alternatively from 0.7 to 3% wt, based upon the total weight of the solid catalyst component.

In some embodiments, the internal electron donor compounds are selected from alkyl and aryl esters of optionally substituted aromatic polycarboxylic acids such as esters of benzoic and phthalic acids. In some embodiments, the esters are selected from the group consisting of n-butylphthalate, di-isobutylphthalate, di-n-octylphthalate, ethyl-benzoate and p-ethoxy ethyl-benzoate.

In some embodiments, the Mg/Ti molar ratio is equal to, or higher than, 13, alternatively in the range of 14 to 40, alternatively from 15 to 40. In some embodiments, the Mg/donor molar ratio is higher than 16, alternatively higher than 17, alternatively ranging from 18 to 50.

In some embodiments, the Bi atoms are derived from one or more Bi compounds not having Bi-carbon bonds. In some embodiments, the Bi compounds care selected from the group consisting of Bi halides, Bi carbonate, Bi acetate, Bi nitrate, Bi oxide, Bi sulphate, and Bi sulfide. In some embodiments, the Bi compounds have Bi valence state of $3^+$. In some embodiments, the Bi halides are selected from the group consisting of Bi trichloride and Bi tribromide. In some embodiments, the Bi compound is $BiCl_3$.

In some embodiments, the solid catalyst component is prepared by reacting a titanium compound of the formula $Ti(OR)_{q-y}X_y$, where q is the valence of titanium and y is a number between 1 and q with a magnesium chloride deriving from an adduct of formula $MgCl_2 \cdot pROH$, where p is a number between 0.1 and 6, alternatively from 2 to 3.5, and R is a hydrocarbon radical having 1-18 carbon atoms. In some embodiments, the titanium compound is $TiCl_4$. In some embodiments, the adduct is prepared in spherical form by mixing alcohol and magnesium chloride, operating under stirring conditions at the melting temperature of the adduct (100-130° C.). Then, the adduct is mixed with an inert hydrocarbon immiscible with the adduct, thereby creating an emulsion which is quickly quenched, causing the solidification of the adduct in form of spherical particles. In some embodiments, the procedure for the preparation of the spherical adducts is as described in U.S. Pat. Nos. 4,399,054 and 4,469,648. In some embodiments, the resulting adduct is directly reacted with a Ti compound or subjected to thermally controlled dealcoholation (80-130° C.), thereby obtaining an adduct wherein the number of moles of alcohol is lower than 3, alternatively between 0.1 and 2.5. In some embodiments, the reaction with the Ti compound is carried out by suspending the adduct (dealcoholated or not) in cold $TiCl_4$; the mixture is heated up to 80-130° C. and kept at this temperature for 0.5-2 hours. In some embodiments, the temperature of the cold $TiCl_4$ is 0° C. In some embodiments, the treatment with $TiCl_4$ is carried out one or more times. In some embodiments, the electron donor compound is added during the treatment with $TiCl_4$.

Several ways are available to add one or more Bi compounds in the catalyst preparation. In some embodiments, the Bi compound is incorporated directly into the $MgCl_2 \cdot pROH$ adduct during the adduct's preparation. In some embodiments, the Bi compound is added at the initial stage of adduct preparation by mixing the Bi compound together with $MgCl_2$ and the alcohol. In some embodiments, the Bi compound is added to the molten adduct before the emulsification step. The amount of Bi introduced ranges from 0.1 to 1 mole per mole of Mg in the adduct. In some embodiments, the Bi compounds, which are incorporated directly into the $MgCl_2 \cdot pROH$ adduct, are Bi halides. In some embodiments, the Bi compounds are $BiCl_3$.

In some embodiments, the alkyl-Al compound (ii) is selected from the group consisting of trialkyl aluminum compounds, alkylaluminum halides, alkylaluminum hydrides and alkylaluminum sesquichlorides. In some embodiments, the alkyl-Al compound (ii) is a trialkyl aluminum compound selected from the group consisting of triethylaluminum, triisobutylaluminum, tri-n-butylaluminum, tri-n-hexylaluminum, and tri-n-octylaluminum. In some embodiments, the alkyl-Al compound (ii) is an alkylaluminum sesquichlorides selected from the group consisting of $AlEt_2Cl$ and $Al_2Et_3Cl_3$. In some embodiments, the alkyl-Al compound (ii) is a mixture including trialkylaluminums. In some embodiments, the Al/Ti ratio is higher than 1, alternatively between 50 and 2000.

The external electron donor compound (iii) is a silicon compound having the formula $(R^1)_a Si(OR^2)_b$ (II)

wherein $R^1$ and $R^2$ are independently selected among alkyl radicals with 1-8 carbon atoms, optionally containing heteroatoms, wherein a is 0 or 1 and a+b=4.

In some embodiments, the silicon compounds of formula (II) are wherein a is 1, b is 3 and $R^1$ and $R^2$ are independently selected from among alkyl radicals having 2-6, alternatively 2-4, carbon atoms.

In some embodiments, the silicon compound is isobutyl triethoxysilane (iBTES).

In some embodiments, the silicon compounds of the formula (II) are wherein a is 0, b is 4, and $R^2$ is independently selected from among alkyl radicals with 2-6, alternatively 2-4, carbon atoms. In some embodiments, the silicon compound is tetraethoxysilane.

In some embodiments, the external electron donor compound (iii) is used in an amount to give a molar ratio between the alkyl-Al compound (ii) and the external electron donor compound (iii) of from 0.1 to 200, alternatively from 1 to 100, alternatively from 3 to 50.

In some embodiments, the polymerization process is carried out by slurry polymerization using as a diluent an inert hydrocarbon solvent, or bulk polymerization using the liquid monomer as a reaction medium. In some embodiments, the liquid monomer is propylene. In some embodiments, the polymerization process is carried out in gas-phase operating in one or more fluidized or mechanically agitated bed reactors.

In some embodiments, the polymerization is carried out at temperatures of from 20 to 120° C., alternatively from 40 to 80° C. In some embodiments, the polymerization is carried out in gas-phase and the operating pressure is between 0.5 and 5 MPa, alternatively between 1 and 4 MPa. In some embodiments, the polymerization is carried out in bulk polymerization and the operating pressure is between 1 and 8 MPa, alternatively between 1.5 and 5 MPa. In some embodiments, hydrogen is used as a molecular weight regulator.

The following examples are given in order to better illustrate the disclosure without limiting it.

EXAMPLES

Determination of Internal Donor Content

The determination of the content of internal donor in the solid catalytic compound was done through gas chromatography. The solid component was dissolved in acetone, an internal reference was added, and a sample of the organic phase was analyzed in a gas chromatograph, to determine the amount of donor present in the starting catalyst compound.

Determination of Xylene Soluble Content.

Xylene Solubles were determined according to ISO 16152:2005; with solution volume of 250 ml, precipitation at 25° C. for 20 minutes, 10 minutes of which with the solution was in agitation (magnetic stirrer), and drying at 70° C. under vacuum.

Determination of Intrinsic Viscosity IV

The sample was dissolved by tetrahydronaphthalene at 135° C. and then poured into a capillary viscometer. The viscometer tube (Ubbelohde type) was surrounded by a cylindrical glass jacket; this setup allowed for temperature control with a circulating thermostatic liquid. The passage of the meniscus in front of the upper lamp started the counter which had a quartz crystal oscillator. The meniscus stopped the counter as the meniscus passed the lower lamp and the efflux time was registered: the efflux time was converted into a value of intrinsic viscosity through Huggins' equation, using the flow time of the pure solvent at the same experimental conditions (same viscometer and same temperature). A single polymer solution was used to determine [η].

Molecular Weight Distribution (Mw/Mn)

Molecular weights and molecular weight distributions were measured at 150° C. using a Waters Alliance GPCV/2000 instrument equipped with four mixed-bed columns PLgel Olexis having a particle size of 13 μm. The dimensions of the columns were 300×7.8 mm. The mobile phase used was vacuum distilled 1,2,4-trichlorobenzene (TCB) and the flow rate was kept at 1.0 ml/min. The sample solution was prepared by heating the sample under stirring at 150° C. in TCB for one to two hours. The concentration was 1 mg/ml. To prevent degradation, 0.1 g/l of 2,6-di-tert-butyl-p-cresol were added. 300 μl (nominal value) of solution were injected into the column set. A calibration curve was obtained using 10 polystyrene reference samples (Easi-Cal kit by Agilent) with molecular weights in a range from 580 to 7 500 000. The K values of the Mark-Houwink relationship were:

$K=1.21\times10^{-4}$ dl/g and $\alpha=0.706$ for the polystyrene standards, $K=1.90\times10^{-4}$ dl/g and $\alpha=0.725$ for the experimental samples.

A third order polynomial fit was used to interpolate the experimental data and obtain the calibration curve. Data acquisition and processing was done by using Waters Empowers 3 Chromatography Data Software with the GPC option.

Melt Flow Rate (MFR)

The melt flow rate (MFR) of the polymer was determined according to ISO 1133 (230° C., 2.16 Kg).

$^{13}$C NMR of Propylene/Ethylene Copolymers $^{13}$C NMR spectra were acquired on a Bruker AV-600 spectrometer equipped with cryoprobe, operating at 160.91 MHz in the Fourier transform mode at 120° C.

The peak of the $S_{\beta\beta}$ carbon (nomenclature according to "Monomer Sequence Distribution in Ethylene-Propylene Rubber Measured by 13C NMR. 3. Use of Reaction Probability Mode," C. J. Carman, R. A. Harrington and C. E. Wilkes, Macromolecules, 1977, 10, 536) was used as internal reference at 29.9 ppm. The samples were dissolved in 1,1,2,2-tetrachloroethane-d2 at 120° C. with an 8% wt/v concentration. Each spectrum was acquired with a 90° pulse, 15 seconds of delay between pulses and CPD to remove $^{1}$H-$^{13}$C coupling. 512 transients were stored in 32K data points using a spectral window of 9000 Hz.

The assignments of the spectra, the evaluation of triad distribution and the composition were made as described in "Carbon-13 NMR determination of monomer sequence distribution in ethylene-propylene copolymers prepared with δ-titanium trichloride-diethylaluminum chloride," M. Kakugo, Y. Naito, K. Mizunuma and T. Miyatake, Macromolecules, 1982, 15, 1150, using the following equations:

$$PPP = 100\, T_{\beta\beta}/S \quad PPE = 100\, T_{\beta\delta}/S \quad EPE = 100\, T_{\delta\delta}/S$$

$$PEP = 100\, S_{\beta\beta}/S \quad PEE = 100\, S_{\beta\delta}/S \quad EEE = 100(0.25 S_{\gamma\delta} + 0.5 S_{\delta\delta})/S$$

$$S = T_{\beta\beta} + T_{\beta\delta} + T_{\delta\delta} + S_{\beta\beta} + S_{\beta\delta} + 0.25 S_{\gamma\delta} + 0.5 S_{\delta\delta}$$

The molar percentage of ethylene content was evaluated using the following equation:

E % mol=100*[PEP+PEE+EEE]. The weight percentage of ethylene content was evaluated using the following equation:

$$E\,\%\text{ wt.} = \frac{100 * E\,\%\text{ mol} * MW_E}{E\,\%\text{ mol} * MW_E + P\,\%\text{ mol} * MW_P}$$

where P % mol is the molar percentage of propylene content, while $MW_E$ and $MW_P$ are the molecular weights of ethylene and propylene, respectively.

The product of reactivity ratio $r_1 r_2$ was calculated according to C. J. Carman, R. A. Harrington and C. E. Wilkes, Macromolecules, 1977; 10, 536 as:

$$r_1 r_2 = 1 + \left(\frac{EEE+PEE}{PEP}+1\right) - \left(\frac{P}{E}+1\right)\left(\frac{EEE+PEE}{PEP}+1\right)^{0.5}$$

The tacticity of propylene sequences was calculated as mm content from the ratio of the PPP mmT$_{\beta\beta}$ (28.90-29.65 ppm) and the whole T$_{\beta\beta}$ (29.80-28.37 ppm)

Determination of the regioinvertions: The determination of the regioinvertions was achieved with C$^{13}$-NMR as described by J. C. Randall in "Polymer sequence determination Carbon 13 NMR method", Academic Press 1977. The content of regioinvertions was calculated on the basis of the relative concentration of S$_{\alpha\beta}$+S$_{\beta\beta}$ methylene sequences.

Melting Temperature Via Differential Scanning Calorimetry (DSC)

The melting points of the polymers (Tm) were measured by differential scanning calorimetry (DSC) on a Perkin Elmer DSC-1 calorimeter, calibrated against indium melting points, and according to ISO 11357-1, 2009 and 11357-3, 2011, at 20° C./min. The weight of the samples in the DSC crucible was kept at 6.0±0.5 mg.

To obtain the melting point, the weighed sample was sealed into aluminum pans and heated to 200° C. at 20° C./minute. The sample was kept at 200° C. for 2 minutes, thereby allowing the crystallites to melt completely. Then, the sample was cooled to 5° C. at 20° C./minute. After standing 2 minutes at 5° C., the sample was heated for the second run time to 200° C. at 20° C./min. In this second heating run, the peak temperature (Tp,m) was taken as the melting temperature.

Oligomer Content

The determination of oligomer content by solvent extraction consisted of treating 5 g of polypropylene sample with 10 ml of methylenedichloride (CH$_2$Cl$_2$) in an ultrasonic bath at 25° C. for 4 hours. 1 μl of the extracted solution was injected into a capillary column and analyzed using FID, without any filtration. For quantitative estimation of oligomer content, a calibration based on external reference method was applied. A series of hydrocarbons (C12-C22-C28-C40) was used.

Examples 1 and 2

Procedure for the Preparation of the Spherical Adduct

Microspheroidal MgCl$_2$.pC$_2$H$_5$OH adduct was prepared according to the method described in Comparative Example 5 of Patent Cooperation Treaty Publication No. WO98/44009, with the difference that BiCl$_3$ in a powder form and in an amount of 3 mol % with respect to the magnesium being added before the feeding of the oil.

Procedure for the Preparation of the Solid Catalyst Component

Into a 500 ml round bottom flask, equipped with a mechanical stirrer, a cooler and a thermometer, 300 ml of TiCl$_4$ were introduced at room temperature under a nitrogen atmosphere. After cooling to 0° C., 9.0 g of the spherical adduct were added while stirring, then diethyl 3,3-dipropylglutarate was sequentially added into the flask. The amount of charged internal donor was to meet a Mg/donor molar ratio of 13. The temperature was raised to 100° C. and maintained for 2 hours. Thereafter, stirring was stopped, the solid product was allowed to settle and the supernatant liquid was siphoned off at 100° C.

After siphoning, fresh TiCl$_4$ and an amount of 9,9-bis(methoxymethyl)fluorene for producing a Mg/diether molar ratio of 13 were added. The mixture was then heated at 120° C. and kept at this temperature for 1 hour under stirring. Stirring was stopped again, the solid was allowed to settle and the supernatant liquid was siphoned off. The solid was washed with anhydrous hexane six times in a temperature gradient down to 60° C. and one time at room temperature. The solid was then dried under vacuum and analyzed.

Prepolymerization Treatment

Before introducing the solid catalyst component into the polymerization reactors, the solid catalyst component was contacted with triethyl aluminum (TEAL) and isobutyltrietoxysilane (iBTES) as reported in Table 1.

Polymerization

The polymerization run was carried out in continuous mode in a series of two reactors equipped with devices to transfer the product from a first reactor to a second reactor immediately next to the first reactor. The two reactors were liquid phase loop reactors. Hydrogen was used as molecular weight regulator. The characterization of the polymer is reported in Table 1.

Comparative Examples 3-4

Comparative examples 3-4 were polymerized as with example 1 with the same catalyst but using methylcyclohexyldimethoxysilane (C donor) or dicyclopentyldimethoxysilane (D donor) as external donor reported in Table 1.

TABLE 1

| | | Ex. 1 | Ex. 2 | Comp Ex. 3 | Comp Ex 4 |
|---|---|---|---|---|---|
| catalyst feed | g/h | 2.3 | 3.4 | 2.9 | 3 |
| catalyst/TEAL | g/g | 0.055 | 0.073 | 0.067 | 0.064 |
| donor | | IBTES | IBTES | D | C |
| TEAL/donor | g/g | 4 | 4.7 | 3.5 | 4.7 |
| Polymerization temperature | ° C. | 67 | 69 | 67 | 67 |
| Pressure | Bar-g | 40 | 40 | 40 | 40 |
| H2/C3 | mol/mol | 0.0033 | 0.0035 | 0.0088 | 0.0071 |
| C2/C2 + C3 | mol/mol | 0.0036 | 0.0031 | 0.0050 | 0.0047 |
| residence time | min | 70 | 71 | 75 | 73 |

C2 = ethylene; C3 = propylene; H2 = hydrogen

The properties of the polymers of Examples 1-4 are reported in Table 2.

TABLE 2

| Ex | | 1 | 2 | comp ex 3 | comp ex 4 |
|---|---|---|---|---|---|
| MFR | g/10' | 38.0 | 52 | 38.0 | 49 |
| C2 | % | 3.7 | 1.6 | 3.5 | 3.5 |
| XS | % | 5.9 | 3.3 | 4.1 | 5.0 |
| Mw/Mn | | 5.9 | 6.3 | 7.4 | 6.4 |
| C2x1.1 + 1.25 | | 5.3 | 3 | 5 | 5.0 |
| C2x1.1 + 2.50 | | 6.6 | 4.2 | 6.4 | 5.0 |
| Tm | ° C. | 140.3 | 153.7 | 139.3 | 140.3 |
| XS IV | dl/g | 0.43 | 0.39 | 0.30 | 0.31 |
| IV | dl/g | <1.5 | <1.5 | <1.5 | <1.5 |
| Oligomer content | pm | 820 | 725 | 1500 | 1090 |

What is claimed is:

1. A propylene ethylene copolymer having the following features:
   an ethylene content of between 1.0 and 4.0% by weight;
   a molecular weight distribution (MWD), expressed in terms of Mw/Mn, of greater than 4.0;
   a content of xylene soluble fraction (XS) and ethylene content (C2) that fulfills the following relationship:

$(C2 \times 1.1) + 1.25 < XS < (C2 \times 1.1) + 2.50$ where:
XS=% by weight of the fraction soluble in xylene at 25° C.;
C2=% by weight of ethylene units in the propylene ethylene copolymer determined via NMR;
a melt flow rate (MFR; 230° C., 2.16 kg) between 30 and 75 g/10 min;
an intrinsic viscosity of the propylene ethylene copolymer lower than 1.5 dl/g; and
an intrinsic viscosity of the fraction soluble in xylene at 25° C. higher than 0.32 dl/g.

2. The propylene ethylene copolymer according to claim 1, wherein the intrinsic viscosity of the propylene ethylene copolymer is lower than 1.3 dl/g.

3. The propylene ethylene copolymer according to claim 1, wherein the propylene ethylene copolymer has a melt flow rate (MFR; 230° C., 2.16 kg) to between 30 and 70 g/10 min.

4. The propylene ethylene copolymer according to claim 1, wherein the propylene ethylene copolymer has a melt flow rate (MFR; 230° C., 2.16 kg) between 30 and 60 g/10 min.

5. The propylene ethylene copolymer according to claim 1, wherein the content of xylene soluble fraction (XS) and ethylene content (C2) fulfill the following relationship:

$$(C2\times1.1)+1.3<XS<(C2\times1.1)+2.4.$$

6. The propylene ethylene copolymer according to claim 1, wherein the content of xylene soluble fraction (XS) and ethylene content (C2) fulfill the following relationship:

$$(C2\times1.1)+1.35<XS<(C2\times1.1)+2.3.$$

7. The propylene ethylene copolymer according to claim 1, wherein the intrinsic viscosity of the fraction soluble in xylene at 25° C. is higher than 0.33 dl/g.

8. The propylene ethylene copolymer according to claim 1, wherein the intrinsic viscosity of the fraction soluble in xylene at 25° C. is higher than 0.36 dl/g.

9. An article of manufacture comprising the propylene ethylene copolymer of claim 1.

10. The article of manufacture of claim 9, wherein the article is an injection molded article.

* * * * *